US007735764B2

(12) United States Patent
Waldron

(10) Patent No.: US 7,735,764 B2

(45) Date of Patent: Jun. 15, 2010

(54) HAMMER ASSEMBLY

(75) Inventor: Christopher John Waldron, Surrey (GB)

(73) Assignee: In-Q-Bator Limited, Twickenham, Middlesex (GB)

( * ) Notice: Subject to any disclaimer, the term of this patent is extended or adjusted under 35 U.S.C. 154(b) by 0 days.

(21) Appl. No.: 12/088,021

(22) PCT Filed: Nov. 16, 2006

(86) PCT No.: PCT/GB2006/004273

§ 371 (c)(1),
(2), (4) Date: Jul. 31, 2008

(87) PCT Pub. No.: WO2007/060394

PCT Pub. Date: May 31, 2007

(65) Prior Publication Data

US 2009/0218427 A1 Sep. 3, 2009

(30) Foreign Application Priority Data

Nov. 22, 2005 (GB) ................................ 0523792.0

(51) Int. Cl.
*B02C 13/28* (2006.01)

(52) U.S. Cl. ........................................ 241/193; 241/99

(58) Field of Classification Search .................. 241/99, 241/193, 194, 73, 190, 189.1, 89.3
See application file for complete search history.

(56) References Cited

U.S. PATENT DOCUMENTS 3,878,995 A 4/1975 Nash
5,184,781 A * 2/1993 Andela ........................ 241/62
5,944,268 A 8/1999 Andela

* cited by examiner

*Primary Examiner*—Mark Rosenbaum
(74) *Attorney, Agent, or Firm*—Nixon & Vanderhye P.C.

(57) ABSTRACT

A hammer assembly (51) for a glass bottle breaking apparatus comprises a shaft (52), a series of collars (53) secured on the shaft (52) and spaced one from another longitudinally of the shaft (52), a series of links (58) each being pivotally connected to a corresponding one of the collars (53) and a series of hammers (55) each being connected for pivotal movement relative to a corresponding one of the links (58), the arrangement being such that the links (58) are each provided with a curved profile (65) for locating an adjacent portion of the shaft (52) so that if, in operation, one of the hammers (55) should strike a glass fragment obstruction without dislodging it immediately, the link (58) associated with the hammer (55) will wind up on the shaft (52) thus reducing a radial displacement between the link (58) and the shaft (52) and drawing the hammer (55) under the obstruction without causing jamming of the apparatus.

3 Claims, 3 Drawing Sheets

Figure 1:
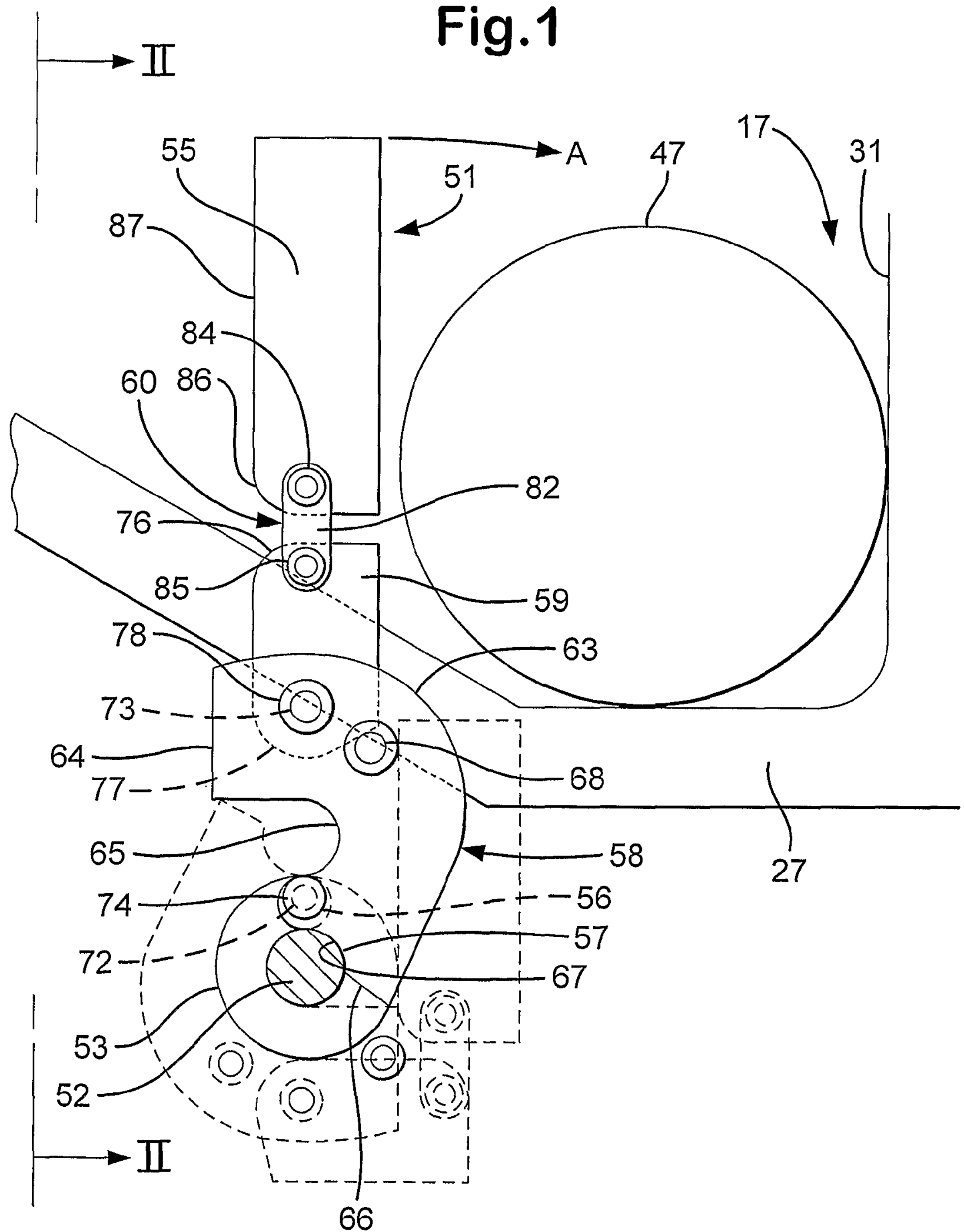

II
A
55
51
47
17
31
87
84
60
86
82
76
85
59
78
63
73
64
68
77
65
58
27
74
56
72
57
67
53
52
II
66

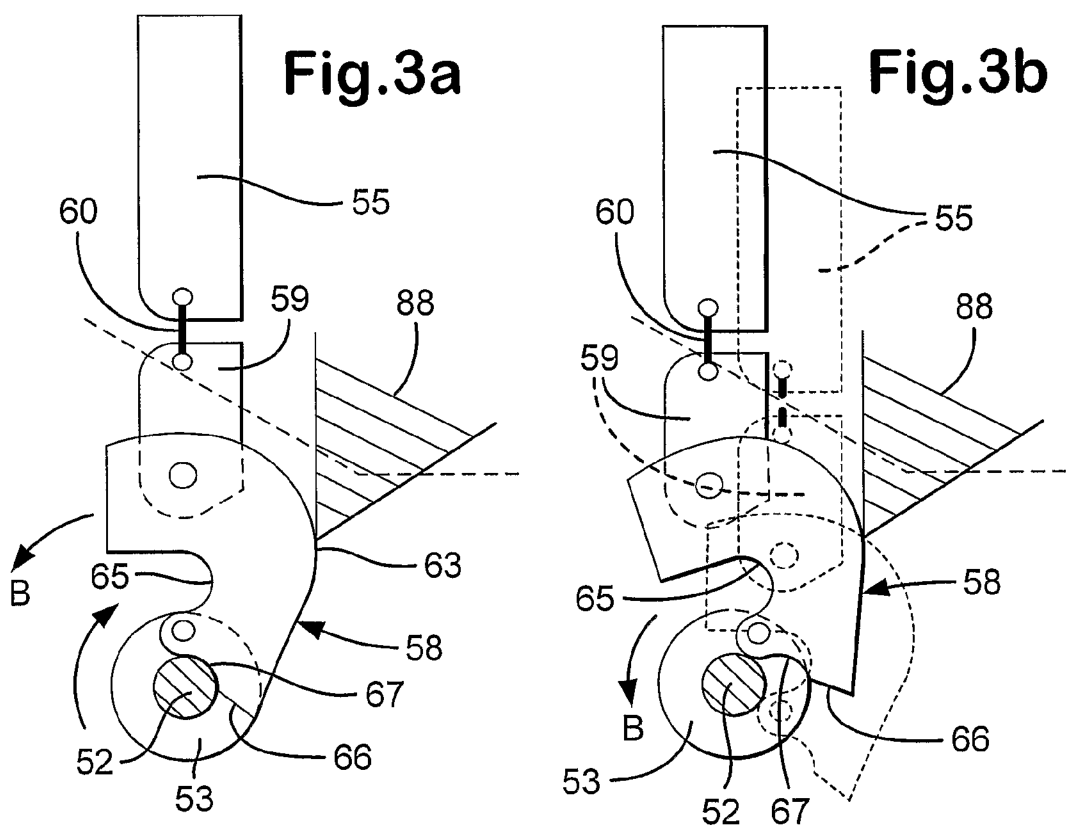
Fig.3a
55
60
59
88
63
B
65
58
67
52
66
53
Fig.3b
55
60
88
59
58
65
B
66
53
52
67
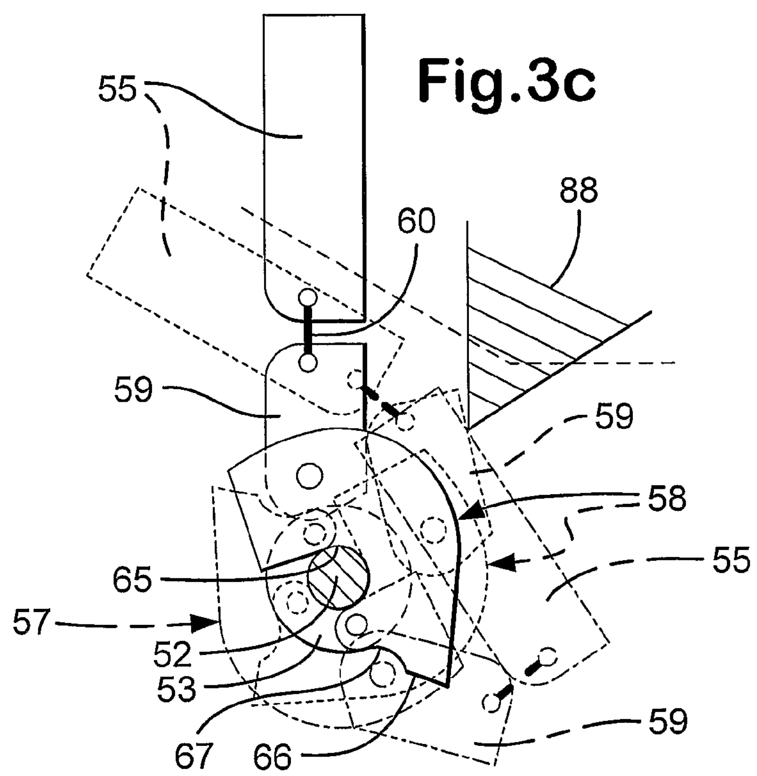
Fig.3c
55
88
60
59
59
58
55
65
57
52
53
67
66
59

HAMMER ASSEMBLY

This application is the U.S. national phase of international Application No. PCT/GB2006/0004273 filed 22 Nov. 2005 which designated the U.S. and claims priority to Great Britain Application No. 0523792.0 filed 22 Nov. 2005, the entire contents of each of which are hereby incorporated by reference.

This invention relates to a hammer assembly and, more particularly, to a hammer assembly for glass bottle breaking apparatus.

In WO 2004/067179 there is disclosed glass bottle breaking apparatus including a hopper, for receiving glass bottles in bulk and comprising a grating, and a shaft, located outside of the hopper, carrying a series of hammers and adapted to be driven so as to rotate on a longitudinal axis thereof whereby the hammers move in a path extending arcuately into and through the hopper, between stringers forming the grating, whereby the hammers impact on bottles located in the path.

In such apparatus, because bottles are smashed within the hopper, there is no necessity to channel the bottles from the hopper to a breaking apparatus and, in consequence, jamming is eliminated or reduced to a minimum.

However, it has been found that, occasionally, glass fragments may lodge between stringers and may cause jamming. It would then be necessary to suspend operation of the apparatus so that the obstruction can be removed manually. However, the downtime would result in increased cost because of the labour necessary to remove the obstruction and the lost time in breaking of bottles. If a more powerful motor were to be used for driving the shaft, this may result in clearing of any such obstruction but would also result in increased cost of the motor and associated components due to the resulting increased forces applied to the structure and an increase in the size and complexity of the system as a whole.

In U.S. Pat. No. 5,944,268 there is disclosed a multi-flail glass pulverizer which includes a hammer assembly comprising a shaft, a series of carriers located on the shaft and spaced one from another longitudinally of the shaft, a series of links each being pivotally connected to a corresponding one of the carriers, and a series of hammers each being connected for pivotal movement relative to a corresponding one of the links.

The hammer assembly according to the present invention also comprises a shaft provided with a series of carriers and corresponding links and hammers but the invention is characterised in that each of the links is provided with a curved profile for locating an adjacent portion of the shaft so that if, when the assembly located in apparatus is in operation, any hammer should strike an obstruction without dislodging the obstruction immediately, the corresponding link pivots relative to the shaft such that an adjacent portion of the shaft is located within the curved profile of the link thereby reducing a radial displacement between the link and the shaft and causing the hammer to be withdrawn from the obstruction.

In effect, therefore, jamming is avoided because any hammer which encounters an obstruction and which does not dislodge it immediately is moved out of contact with the obstruction as the shaft continues to rotate but the action is repeated causing the obstruction to become dislodged over time without arresting operation of the assembly.

Following is a description, by way of example only and with reference to the accompanying drawings, of one method of carrying the invention into effect.

In the drawings.

Figure 2:
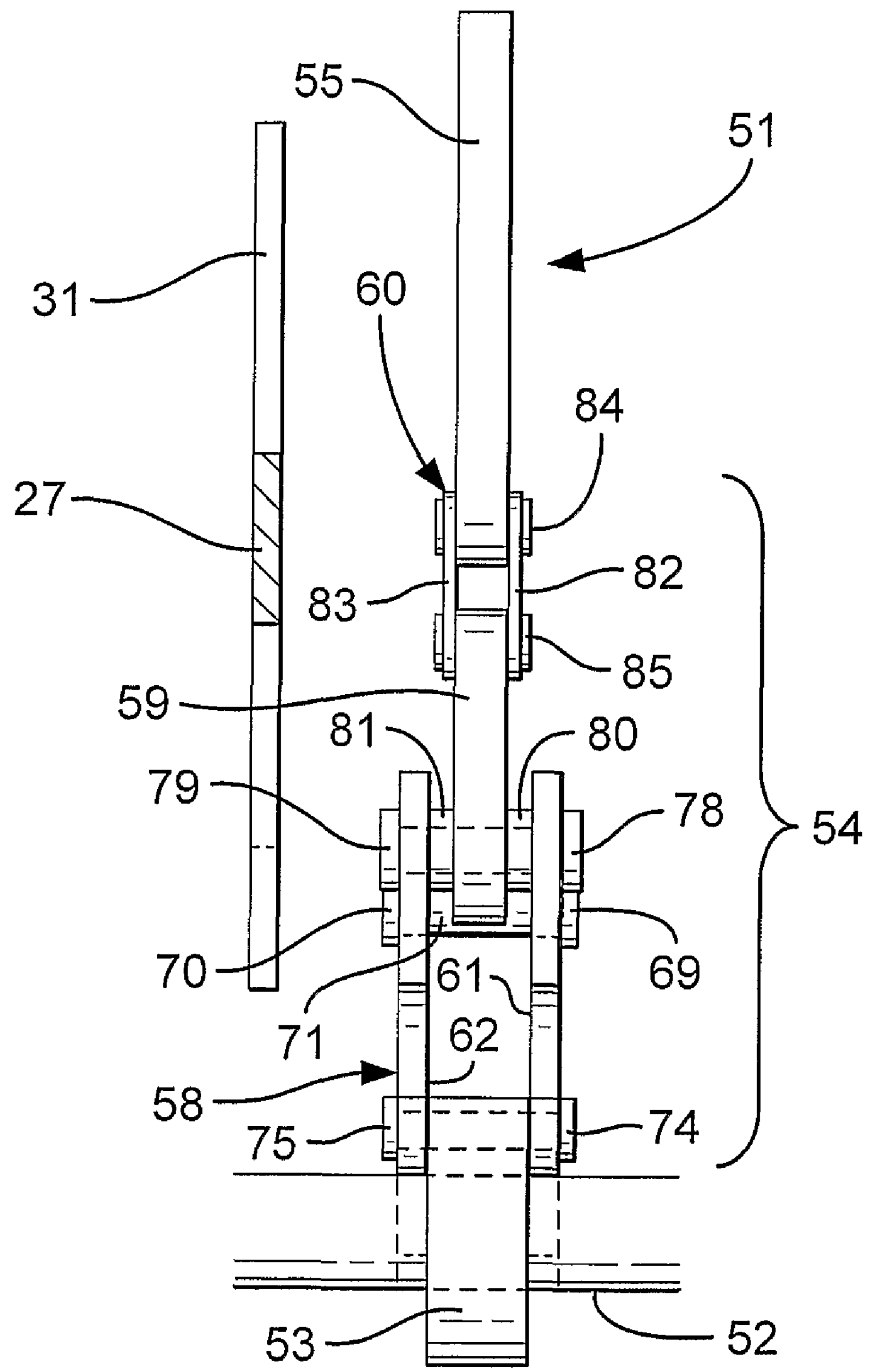

FIG. 1 is diagrammatic representation of one embodiment of a hammer assembly in accordance with the present invention, FIG. 2 is a cross section on the line II-II of FIG. 1, and FIGS. 3*a*, 3*b* and 3*c* are diagrammatic representations of the assembly shown in FIGS. 1 and 2 indicating sequential positions of components of the assembly when in operation and in the event the components striking an obstruction.

Referring now to FIGS. 1 and 2 of the drawings, there is shown a hammer assembly 51 for use in glass bottle breaking apparatus of the kind disclosed in WO 2004/067179. Such apparatus includes a hopper 17 for receiving bottles in bulk, one such bottle being shown at 47 lying on its side with its base in view, a lower portion of the hopper 17 being in the form of a grating comprising a plurality of spaced parallel stringers, one of which is shown at 27, which provide a back stop 31.

The hammer assembly 51 comprises a shaft 52 having secured thereto a plurality of collars, one of which is shown at 53, a plurality of link means, one of which is shown at 54, and a plurality of hammers, one of which is shown at 55. Each of the collars 53 is provided with an eccentric aperture 56 in addition to its central aperture 57.

Each of the link means 54 comprises a gooseneck shaped base link 58, an intermediate link 59 and a bicycle chain link 60.

Each base link 58 comprises two identical webs 61, 62 each having a convex leading edge 63, a flat trailing edge 64 contiguous with a rear entry cavity 65 having a concave wall, the radius of which corresponds with the radius of the shaft 52, and a flat base 66 contiguous with a trailing concave recess 67, the radius of which also corresponds with the radius of the shaft 52. The two webs 61, 62 are connected in spaced parallel relation one to another by means of a bridge 68. As shown, the bridge 68 comprises a bolt 69, secured by means of a nut 70, and a spacer tube 71 through which the shank of the bolt 69 extends, the tube 71 being located between the webs 61, 62. Each of the webs 61, 62 is also provided with a first aperture 72 between the cavity 65 and the recess 67 and a second aperture 73 adjacent the trailing edge 64. Each base link 58 is connected to a corresponding one of the collars 53 by a corresponding bolt 74, the shank of which extends through the first aperture 72 of the webs 61, 62 and the eccentric aperture 56 of the collar 53 and the bolt 74 being secured by a nut 75, whereby the base link 56 is freely pivotable relative to the corresponding collar 53.

The intermediate link 59 is substantially rectangular in configuration having rounded corners 76, 77 at opposite ends of a long trailing edge thereof and first and second apertures (not shown) each adjacent a corresponding one of the rounded corners 76, 77. Each intermediate link 59 is connected to a corresponding base link 58 by means of a bolt 78 the shank of which extends through the second aperture 73 of the webs 61, 62 and the second aperture of the intermediate link 59 and the bolt 78 being secured by a nut 79, there being washers 80, 81 located on the bolt 78 on opposite sides of the intermediate link 59 for centering the intermediate link 59 relative to the bolt 78 whereby the intermediate link 59 is freely pivotable relative to the base link 58.

The bicycle chain link 60 comprises a pair of elongate plates 82, 83, a pair of studs 84, 85 each located at a corresponding one of opposite ends of each of the plates 82, 83 and corresponding tubular spacers (not shown) through which the respective studs 84, 85 co-axially extend whereby the plates 82, 83 extend in spaced parallel relation one to another. Each bicycle chain link 60 is connected to a corresponding intermediate link 59 by means of a lower one 85 of the studs 84, 85, which extends through the first aperture of the intermediate link 59, whereby the bicycle chain link 60 is freely pivotable relative to the intermediate link 59.

Each of the hammers 55 is of elongate rectangular configuration, one corner of which is rounded, as shown at 86, and provided with an aperture (not shown) adjacent the rounded corner 86. Each of the hammers 55 is connected to a corresponding bicycle chain link 60 by means of the upper one 84 of the studs 84, 85 whereby the long edge 87 of the hammer 55 having the rounded corner 86 is a trailing edge and the hammer 55 is freely pivotable relative to the bicycle chain link 60.

In operation, the shaft 52 is driven so that it rotates in a clockwise direction when viewed in FIG. 1. In consequence, the path of the hammers 55 extends arcuately into and through the hopper 17, as indicated by the arrow "A" in FIG. 1, and towards and through the back stop 31 such that the hammers 55 successively impact on bottles 47 located in the path against the back stop 31 causing breakage of the bottles 47.

Referring now to FIGS. 3*a*, 3*b* and 3*c* in addition to FIG. 1, the configuration of the hammer assembly 51 is such that the concave recess 67 contiguous with the base 66 of each of the base links 58 abuts the shaft 52 but, should a fragment of glass become lodged between adjacent stringers 27 and not be dislodged by immediate impact of an adjacent one of the hammers 55 and thereby become an obstruction 88, the link means 54 associated with the hammer 55 striking the obstruction 88 would wind up on the shaft 52 and the hammer 55 would move around the obstruction 88, thereby avoiding jamming.

In FIG. 3*a*, a base link 58 is shown abutting the obstruction 88. Since the leading edge 63 of the base link 58 is convex, it acts as a cam surface with regard to obstruction 88 in that the reaction with the obstruction 88 causes the base link 58 to turn in a counter-clockwise direction relative to the shaft 52, when viewed in FIG. 3*a* and indicated by the arrow "B", as the shaft 52 continues to turn in a clockwise direction.

The base link 58 thus passes under the obstruction 88, as shown in FIG. 3*b*, and the leading edge of the intermediate link 59 then abuts the obstruction 88. Since the intermediate link 59 is pivotally connected to the base link 58, this also passes under the obstruction, as shown in FIG. 3*c*. However, this is only possible because the base link 58 is provided with the rear entry cavity 65 which accommodates an adjacent portion of the shaft 52 as the link means 54 combination of the base link 58 and the intermediate link 59 winds up on the shaft 52 and, finally, the hammer 55 passes under the obstruction 88, as shown in chain-dotted lines in FIG. 3*c*, the radial displacement between the distal end of the hammer 55 and the shaft 52 having effectively been reduced.

It will be appreciated, therefore, that any impact of the base link 58, the intermediate link 59 and the hammer 55 which did not result in immediate dislodging of the obstruction 88 would not result in arresting operation of the hammer assembly 51. However, as the shaft 52 continues to rotate, such impacts would, over time, result in the obstruction 88 becoming dislodged without the glass bottle breaking apparatus having to be shut down in order that the obstruction 88 may be removed manually.

It will also be appreciated that the above-described sequence is for illustrative purposes only. It cannot be predicted as to where any obstruction 88 may become lodged, if at all, and it is possible that, if there should be any obstruction 88, it may only be struck by a hammer 55 or a combination of an intermediate link 59 and a hammer 55. In any event, if there should be present any such obstruction 88 and the hammer assembly 51 is in operation and striking of the obstruction 88 does not dislodge the obstruction 88, the hammer assembly 51 will configure itself in the manner described with reference to FIGS. 1 and 3*a* to 3*c* and jamming should be avoided.

A further advantage derives from the hammer assembly 51 in that the presence of the bridge 68, in the described embodiment provided by the bolt 69, the nut 70 and the spacer tube 71, of each base link 58 prevents the corresponding intermediate link 59 from pivoting beyond 90 degrees forwardly in the direction of rotation of the shaft 52 beyond the position shown in FIG. 1, until the shaft 52 itself turns beyond that degree of arc. Since the corresponding hammer 55 is spaced only a short distance from the intermediate link 59, its movement is also limited until it abuts the intermediate link 59. The result is that each of the intermediate links 59 and their corresponding hammers 55 do not swing downwardly as soon as they pass the positions shown in FIG. 1.

This, of course, will be the situation when the hammer assembly 51 is inoperative in that some of the intermediate links 59 and their corresponding hammers 55, more particularly those that have swung past the position shown in FIG. 1 when the hammer assembly 51 last became inoperative but which had not yet reached the position of depending downwardly from the shaft 52, would extend radially outwardly from the shaft 52. This provides greater moment than if the intermediate links 59 and their corresponding hammers 55 were to hang downwardly and thereby assists a drive motor on start-up. Coincidently, intermediate links 59 and their corresponding hammers 55 located on the other side of the shaft 52 on start-up would hang down and would provide lesser moment and this, also, would assist the drive motor on start-up.

It will be appreciated that each base link 58, instead of being constructed by assembling together the webs 61, 62 and the bridge 68 formed by the bolt 69, the nut 70 and the spacer tube 71, may be manufactured as a single unit by, for example, casting or milling.

The invention claimed is:

1. A hammer assembly for glass bottle breaking apparatus comprising;

a shaft, a series of carriers secured on the shaft and spaced one from another longitudinally of the shaft, a series of links each being pivotally connected to a corresponding one of the carriers, and a series of hammers each being connected for pivotal movement relative to a corresponding one of the links, wherein each of the links is provided with a recess sized and configured to receive an adjacent portion of the shaft so that in operation if any hammer should strike an obstruction without dislodging the obstruction immediately, the corresponding link pivots relative to the shaft such that the adjacent portion of the shaft is received within the recess of the link thereby reducing a radial displacement between the link and the shaft and causing the hammer to be withdrawn from the obstruction.

2. An assembly as claimed in claim 1, which further comprises a plurality of sets of links, wherein each set of links connects a corresponding hammer to a corresponding carrier, and wherein the links of each set is pivotally connected one to another in series and includes one of the links provided with the recess for receiving the adjacent portion of the shaft.

3. An assembly as claimed in claim 2, wherein each link provided with the recess for receiving the adjacent portion of the shaft includes an abutment for restricting pivotal movement of an adjacent link relative thereto.

* * * * *